United States Patent
Carofiglio et al.

(10) Patent No.: US 10,178,019 B2
(45) Date of Patent: Jan. 8, 2019

(54) LOW-OVERHEAD ANCHORLESS MANAGING OF PRODUCER MOBILITY IN INFORMATION-CENTRIC NETWORKING

(71) Applicant: Cisco Technology, Inc., San Jose, CA (US)

(72) Inventors: Giovanna Carofiglio, Châtenay-Malabry (FR); Jordan Augé, Montrouge (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 15/059,985

(22) Filed: Mar. 3, 2016

(65) Prior Publication Data

US 2017/0034041 A1  Feb. 2, 2017

Related U.S. Application Data

(60) Provisional application No. 62/198,950, filed on Jul. 30, 2015.

(51) Int. Cl.
  *H04L 12/733* (2013.01)
  *H04L 12/755* (2013.01)
(52) U.S. Cl.
  CPC .......... *H04L 45/122* (2013.01); *H04L 45/021* (2013.01)

(58) Field of Classification Search
  CPC ..... G01S 5/0289; H04W 40/248; H04L 12/28
  See application file for complete search history.

(56) References Cited

U.S. PATENT DOCUMENTS

| 7,970,574 | B2 | 6/2011 | Jin |
| 2007/0005292 | A1* | 1/2007 | Jin ........................ G01S 5/0289 |
| | | | 702/150 |
| 2013/0250809 | A1 | 9/2013 | Hui et al. |

OTHER PUBLICATIONS

Rad et al. "Anchorless Cooperative Localization for Mobile Wireless Sensor Networks" Delft University of Technology—TU Delft; May 2011, pp. 9-16.

(Continued)

*Primary Examiner* — Mansour Oveissi
(74) *Attorney, Agent, or Firm* — Parker Ibrahim & Berg LLP; James M. Behmke; Stephen D. LeBarron

(57) ABSTRACT

In one embodiment, a device in an anchorless network receives an update message from a first neighbor of the device. The update message indicates a movement of a node in the network to a new position in the network. The device updates a forwarding table of the device to reverse a link direction associated with the node, in response to receiving the update message. The device sends the update message to a second neighbor of the device towards a prior position of the node in the network.

18 Claims, 21 Drawing Sheets

(56) References Cited

OTHER PUBLICATIONS

Zhu et al. 'RFC6301:A Survey of Mobility Support in the Internet', Mar. 2011.
Tyson et al. 'A Survey of Mobility in Information-centric Networks: Challenges and Research Directions', in Proc. of the 1st ACM Workshop on Emerging Name-Oriented Mobile Networking Design, 2012.
Hermans et al. 'Global Source Mobility in the Content-centric Networking Architecture', in Proc. of the 1st ACM Workshop on Emerging Name-Oriented Mobile Networking Design, 2012.
Zhang et al. 'Kite: A mobility support scheme for ndn', in Proc. of the 1st international conference on Information-centric networking, 2014.
Kim et al. 'Mobility support in content centric networks', in Proc. of the second edition of the ACM Sigcomm ICN workshop, 2012.

* cited by examiner

LOW-OVERHEAD ANCHORLESS MANAGING OF PRODUCER MOBILITY IN INFORMATION-CENTRIC NETWORKING

RELATED APPLICATIONS

This application claims priority to U.S. Provisional Application No. 62/198,950, filed Jul. 30, 2015, entitled "LOW-OVERHEAD ANCHORLESS MANAGING OF PRODUCER MOBILITY IN INFORMATION-CENTRIL NETWORKING," by Carofiglio, the contents of which are herein incorporated by reference.

TECHNICAL FIELD

The present disclosure relates generally to computer networks, and, more particularly, to low-overhead anchorless managing of producer mobility in information-centric networking.

BACKGROUND

With the phenomenal spread of connected user devices, mobility has become a basic premise for almost any network communication as well as a compelling feature to integrate in next generation networks (e.g., 5G). The need for a mobility management model to apply within IP networks has striven a lot of efforts in research and standardization bodies (e.g., 3GPP), all resulting in a complex access-dependent set of mechanisms implemented in a dedicated control infrastructure. The complexity and lack of flexibility of such approaches (e.g., Mobile IP) calls today for a radically new solution dismantling traditional assumptions like tunneling and anchoring all mobile communications into a network core.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in an anchorless network receives an update message from a first neighbor of the device. The update message indicates a movement of a node in the network to a new position in the network. The device updates a forwarding table of the device to reverse a link direction associated with the node, in response to receiving the update message. The device sends the update message to a second neighbor of the device towards a prior position of the node in the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
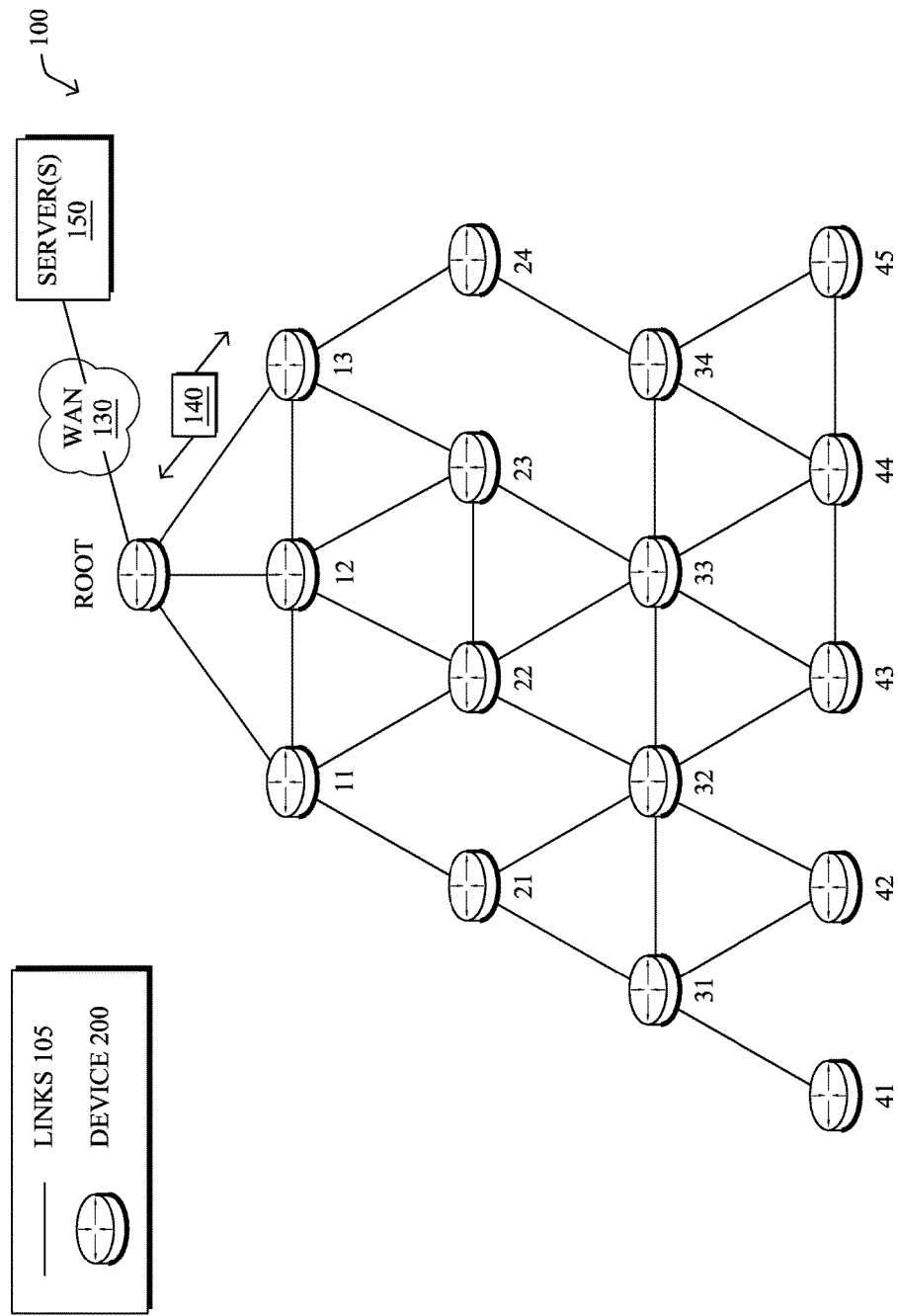
FIG. 1 illustrates an example communication network.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "Root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
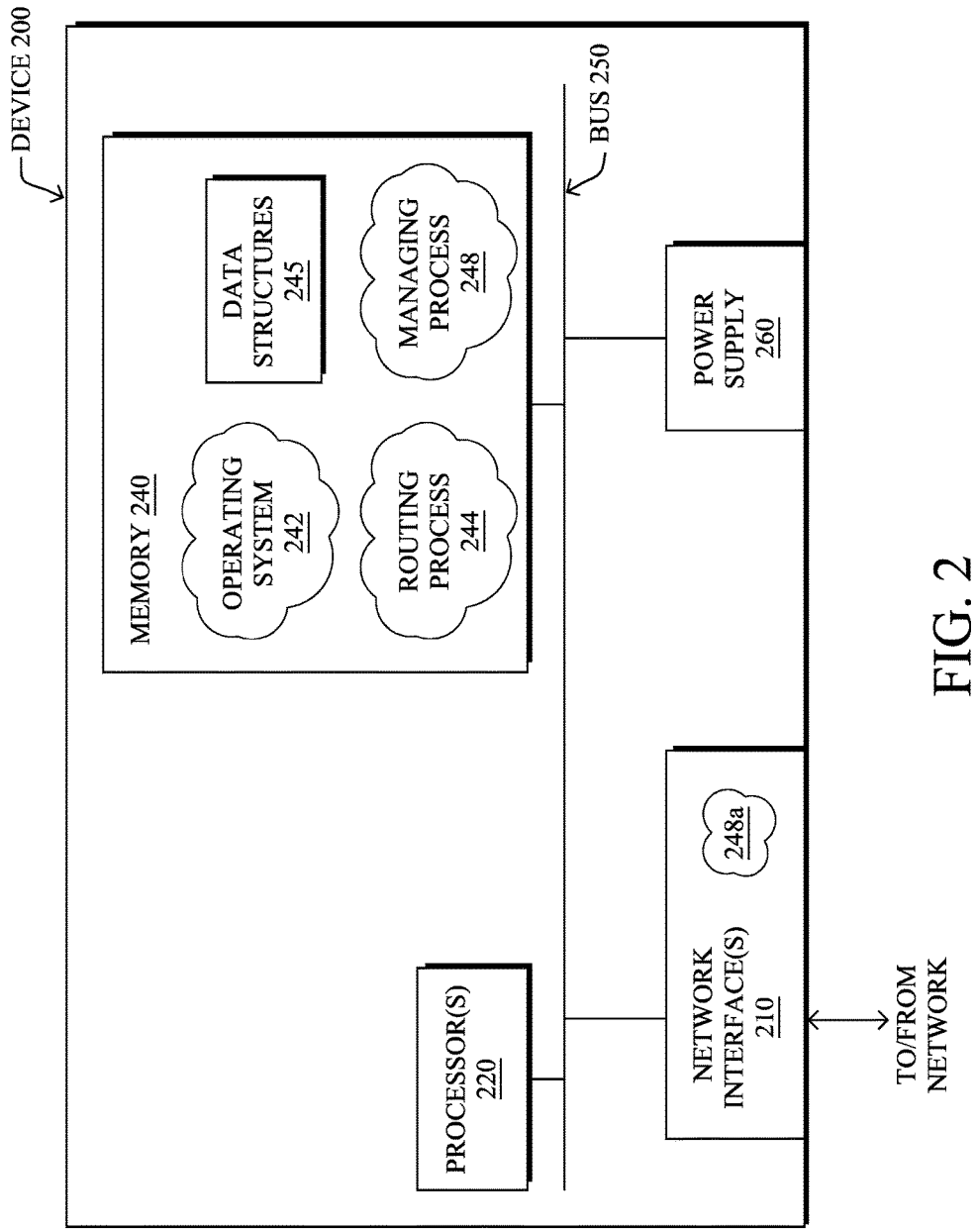
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software is programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "managing" process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET is On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing is things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL is merely one example protocol, and is not meant to be limiting to the scope of the embodiments herein.

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG. Typically, a Direction Oriented DAG (DODAG) is formed in which the DAG is rooted at a single device, such as a border router.

According to the illustrative RPL protocol, a DODAG Information Object (DIO) is a type of DAG discovery message that carries information that allows a node to discover a RPL Instance, learn its configuration parameters, select a DODAG parent set, is and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

As noted above, mobility has become a basic premise for almost any network communication as well as a compelling feature to integrate in next generation networks (e.g., 5G). The need for a mobility management model to apply within IP networks has is prompted numerous efforts by research and standardization bodies (e.g., 3GPP), all resulting in a complex, access-dependent set of mechanisms implemented in a dedicated control infrastructure. The complexity and lack of flexibility of such approaches (e.g., Mobile IP) calls today for a radically new solution dismantling traditional assumptions like tunneling and anchoring all mobile communications into a network core.

In the IoT, wireless sensor networks started with fixed devices but use cases are now flourishing where some IoT devices are now mobile. For instance, industrial Internet may require the deployment of sensors on engines, cranes, small vehicles, mobile workers, etc. At the same time, Information-Centric Networking (ICN) is getting traction as an optimized model to extract data from sensor over LLN mesh technologies. In that space, it is not possible to update all the nodes in the network about the mobility of one small device, and a low impact / low overhead method is required. Native support for mobility, security and storage functionalities inside network architecture, makes ICN a promising candidate for both LLN and 5G.

Under the collective name ICN, there are network architecture designs sharing the idea of having network operations based on content identifiers (names) rather than location identifiers. ICN basic principles include name-based routing, pull-based multi-point to multi-point communication controlled by user requests, and in-path caching as a built-in network feature. It results in a connectionless data delivery where packet requests are sent to the network with no need for a point-to-point connection setup. As the end user and the content are not bounded to a network addressable interface, network mobility is part of the communication model itself.

Indeed, in ICN, mobility is managed in a very different way than in IP: the communication focuses on names rather than on network addresses, hence a change in physical location does not imply a change in the data plane. Consumer mobility is naturally supported by virtue of its connectionless and pull-based transport mode, implying a simple retransmission by the consumer of interests for not yet received data. Producer mobility and real-time group communication are more challenging to support, is depending on the frequency of the mobility and on the content lifetime.

One specific problem in ICN currently is that of managing local (intended as intra-AS, Autonomous System) producer mobility. Notably, many efforts have been devoted to define mobility management models for IP networks in the last two decades, resulting in a variety of proposed, often not implemented solutions. A good survey of these approaches may be found in the IETF RFC 6301, "A Survey of Mobility Support in the Internet", by Zhu et al., March 2011. In the IP context, there are two classes of mobility management approaches: rendezvous-based and anchor-based (or indirection-based). In ICN such mobility models are adapted to the new architectural constraints and, to overcome their weaknesses, a new class of approaches has been defined, that have been denoted herein as anchorless. Therefore, previous work addressing mobility management in ICN can be roughly divided into three classes:

(i) rendezvous-based approaches, involving a resolution of identifiers into locators performed by dedicated network nodes, as a separate request, (ii) anchor-based (or indirection-based) approaches, where a fixed network node is kept aware of mobile node movements and intercepts/redirects packets to him, and (iii) anchorless approaches, where the mobile node is directly responsible for notifying the network about his movements.

The first class of approaches has good properties in terms of scalability and low signaling overhead, but appears unsuitable for frequent mobility and for reactive rerouting of latency-sensitive traffic. Anchor-based approaches show better reactivity and good path stretch properties, but at the cost of larger signaling overhead. In addition, anchor-based approaches suffer from single point of passage problem, preventing ICN multipath and limiting robustness to failure. Anchorless approaches, on the other hand, are less common and are introduced to enhance reactivity with respect to anchor-based solutions. Better reactivity, simplicity, and insensitivity to frequency of relocations make anchorless solutions appealing. However, challenges still remain to devise mechanisms to effect routing updates in the case of intra-AS producer mobility in an anchorless network.

Low-Overhead Anchorless Managing of Producer Mobility

The techniques described herein leverage ICN principles to implement an anchorless forwarding update mechanism in a network. In some aspects, the techniques herein exploit ICN features like stateful forwarding, dynamic, and distributed Interest load-balancing, as well as, in-network caching, to define a timely forwarding update mechanism. In particular, a temporary forwarding information base (TFIB) may be maintained at routers relaying former and current producer locations. Such a mechanism does not rely on global routing updates, which would be too slow and too costly in many networks. Rather, the mechanism herein works at a faster timescale, by propagating temporary forwarding updates in a way to guarantee recovery of consumer-to-producer connectivity as fast as possible.

Specifically, in some embodiments, a device in an anchorless network receives an update message from a first neighbor of the device. The update message indicates a movement of a node in the network to a new position in the network. The device updates a forwarding table of the device to reverse a link direction associated with the node, in response to receiving the update message. The device sends the update message to a second neighbor of the device towards a prior position of the node in the network.

Illustratively, the techniques described herein may be performed by hardware, software, and/or firmware, such as in accordance with the "managing" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional routing/management protocols, and as such, may be processed by similar components understood in the art that execute those protocols, accordingly.

Figure 3:
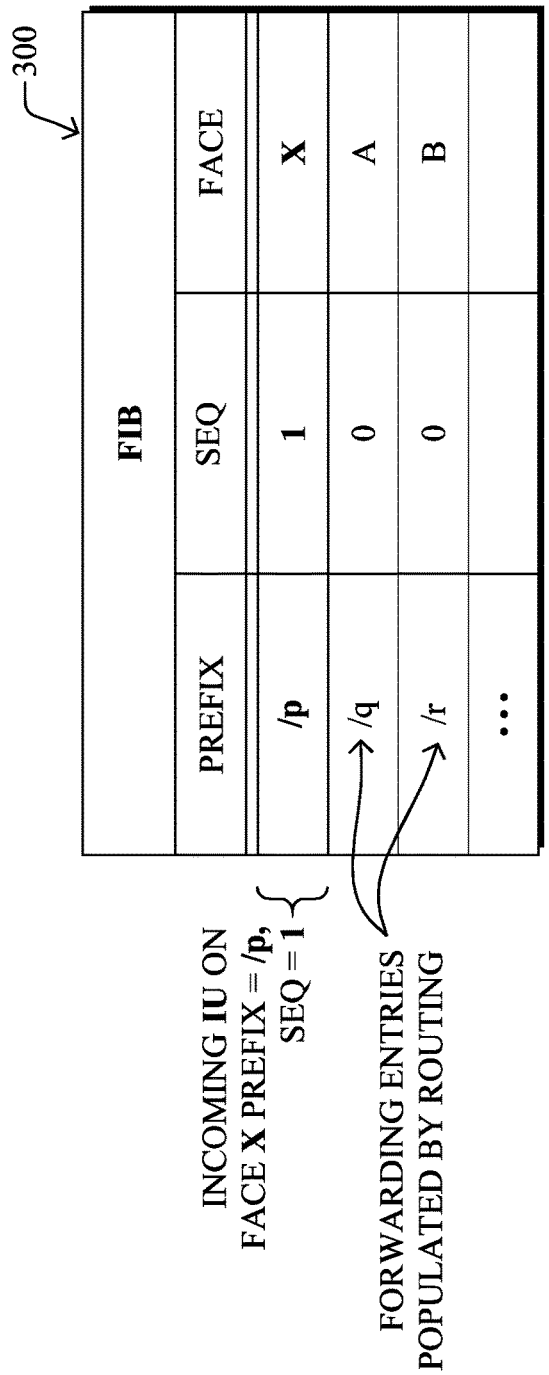
FIG. 3 illustrates an example forwarding information base (FIB) update.

Referring now to FIG. 3, an example update is shown to a forwarding information base (FIB) 300, according to various embodiments. Such a table may be maintained by a is router or other device in a network and used to make forwarding decisions (e.g., stored in data structures 245 of device 200). Generally, the techniques herein assume that the forwarding tables of the network devices have already been populated by a routing protocol (e.g., OSPF, etc.) and that mobility is local in nature (e.g., within a single AS). In addition, it is also assumed that the network is an anchorless network that allows a producer to be responsible for a given prefix and to securely advertise the prefix, with each of the routers checking the validity of such announcements.

According to various embodiments, a protocol is introduced herein that allows mobile producers/nodes to advertise prefixes and alter the forwarding of interests in an ICN router. This may be achieved by giving update packets special treatment and using these updates to update the local FIB of the device. In particular, a special update message, referred to as an Interest Update (IU), is proposed herein to indicate the movement of a producer in the network and to effect a forwarding change in the network. In one embodiment, an IU may be a custom ICN interest packet that comprises an additional flag that triggers appropriate processing of the update message at a router. When a producer node moves to a new attachment point, the node may send an IU for each of the prefixes for which it is responsible, to signal the availability of its prefixes at its new location to the rest of the network.

To take mobility into account, and resolve concurrency issues due to Interest Update propagation in the network, the techniques herein introduce a sequence number as an additional FIB entry. This sequence number is maintained by the mobile producer, incremented at each change of location, and added to each Interest Update to be transported to the different FIB s.

For example, as shown in FIG. 3, in a router with mobility support, FIB 300 thus includes three main fields: the prefix, the list of next-hop faces, and a corresponding sequence number. When initially populated by routing, the techniques herein propose this sequence number to be set as zero or another default number, without any loss of generality. For example, FIB 300 may be initially populated with entries for prefixes /q and /r with corresponding sequence number of zero. At a later point in time, assume that is the device receives an IU on face X with prefix /p and sequence number 1. In turn, the device may update FIB 300 to include an entry corresponding to the received IU. When moving to a new point of attachment, the producer may increase its sequence number. In other words, the sequence number used by a producer may correspond to the number of movements of the producer in the network (e.g., the sequence number may be equal to 1 after the first movement, etc.). Then, the producer node may send an IU that is a custom ICN interest packet with an IU flag set, a name field equal to the prefix, and including the current sequence number.

Figures 4A, 4B:
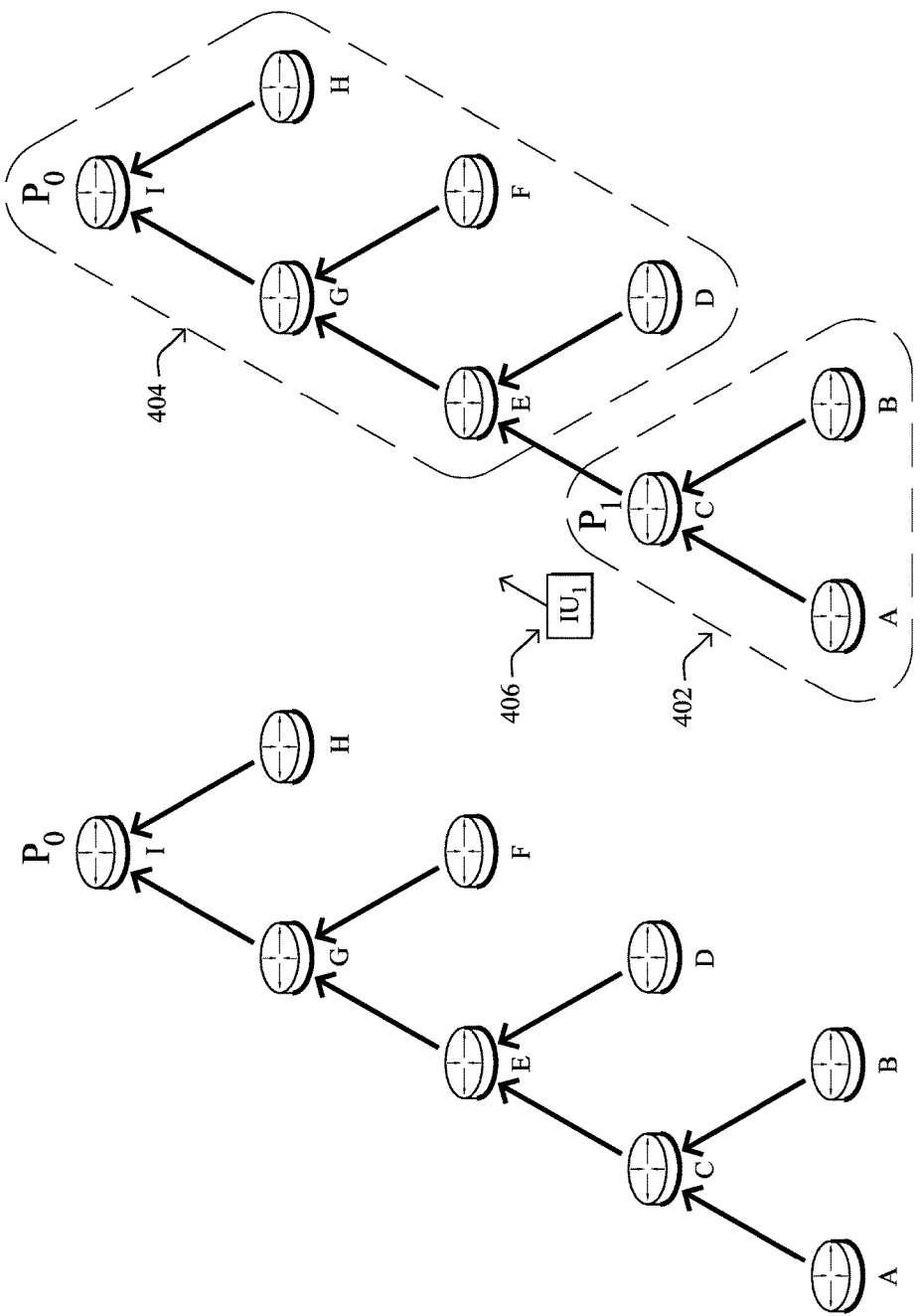
FIGS. 4A-4H illustrate examples of producer mobility in a network;
FIGA. 5A-5B illustrate example test results using the anchorless techniques herein.

Referring now to FIGS. 4A-4H examples of producer mobility in a network are illustrated, according to various embodiments. For the sake of clarity, consider the case in which each router/device A-I has a single next-hop. In this case, the forwarding paths in the network form a directed tree (e.g., a shortest-path tree) rooted at the producer's point of attachment, and transmit all traffic towards the root. For example, as shown in FIG. 4A, assume that the producer node is initially attached at point $P_0$, thereby forming a directed tree among devices A-I that is rooted at device I. In particular, the tree shown represents the initial forwarding tree obtained by the routing protocol for a given prefix, initially located at position $P_0$, over an underlying topology that is not represented here for the sake of clarity. The FIB entry is represented for each router by the arrow pointing to the next hop interface, and the associated sequence number (initialized to 0). Forwarding is thus consistent across the whole network at this point.

As shown in FIG. 4B, consider the case in which the producer moves to position $P_1$ at a later point in time. In such a case, only the routers in group 402 (e.g., device C and its children, A-B) will be able to route traffic towards the mobile producer. The other routers shown in group 404 are thus uninformed of the change and will continue to forward traffic destined for the producer towards point $P_0$. To reconcile groups 402-404, P may send an IU 406 towards the prior position $P_0$ with a corresponding sequence number for the producer (e.g., '1' to represent that this is the first movement of the producer) and its FIB entry.

Although forwarding entries are invalid to route consumer interests in an ICN, they are still useful to disseminate forwarding updates. When a router receives an IU, it can deduce that the producer has moved and that it can now reach the producer by sending traffic through the IU ingress interface. The router/device can then forward the update announcement to the next hop which will iterate the process until reaching a former producer location. The end router will have a stale entry in its FIB and will thus not be able to forward the IU further, thereby concluding the update process. Note that such an update preserves the structure of the initial forwarding tree, and consists in switching the orientation of a minimal number of vertices to obtain a new tree rooted at the new producer location.

Pseudo code for the processing of a received IU U on a face F is shown below, according to various embodiments:

```
IUForward(IU U, Face F) {
  Check Validity( )
  U.prefix → prefix;
  FIB.EPM(U.prefix) → ε.seq;
// if the sequence is the highest, forward U, update FIB, and ack source
  if seq > ε.seq then
    { Send(U(prefix, seq), ε.face))
      F → ε.face;
      seq → ε.seq;
      Send (U_ack(prefix, seq), F)}
// otherwise, send the updated interest backwards
  elseif seq < ε.seq then
    {Send (U(prefix, ε.seq), F}
// otherwise, discard U
}
```

Such IU forwarding takes precedence over normal interest forwarding for IU packets, and there is no FIB nor CS lookup. The forwarding process of regular consumer's interests may remain unchanged. By quickly reconnecting the prefix to the network, this process should provide a good performance for flows in progress. By preserving the tree structure, it should allow for good network performance in terms of path stretch and signaling overhead. In addition, it does not introduce any new loop in the forwarding.

Figure 4C:
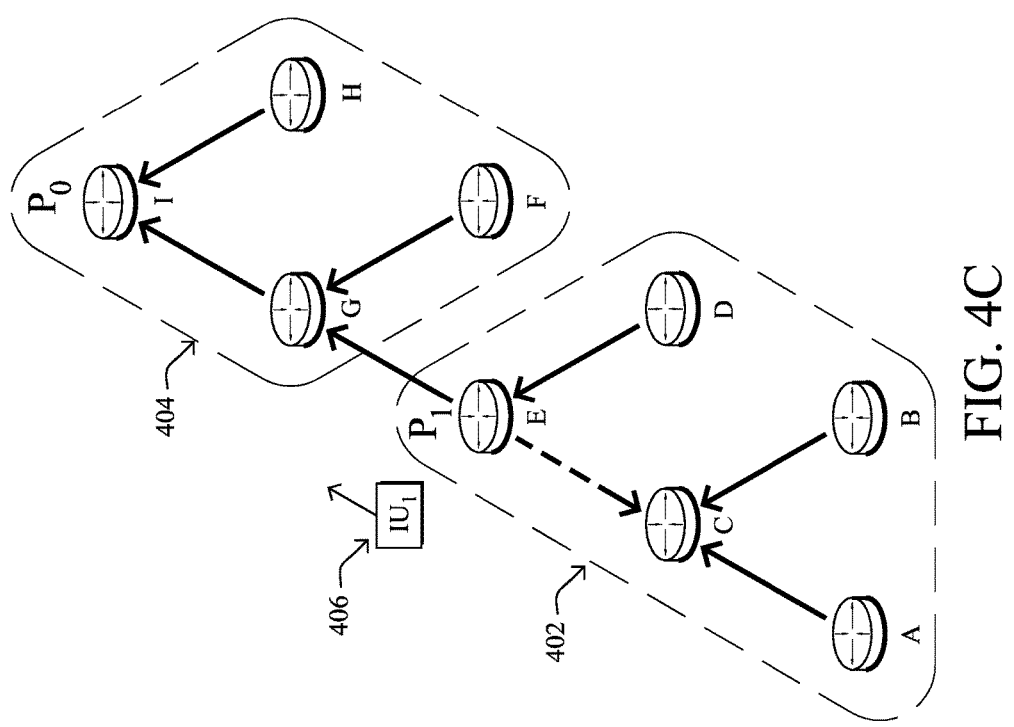

As shown in FIG. 4C, assume that router/device E determines that the sequence number of IU 406 is the highest sequence encountered by router E. In response, router E may update its FIB to point towards the IU ingress interface, with sequence number 1. This increases the number of routers consistently forwarding their traffic towards the new producer location, $P_1$. Notably, by effectively reversing the direction of link C-E, devices D and E are able to join the set 402 of devices that are able to forward traffic toward the producer's new location, $P_1$. In turn, device E may forward IU 406 towards the prior location of the producer, $P_0$. The update process may be repeated by each of the nodes along the path to the original root of the forwarding tree that corresponds to former producer location $P_0$.

Figure 4D:
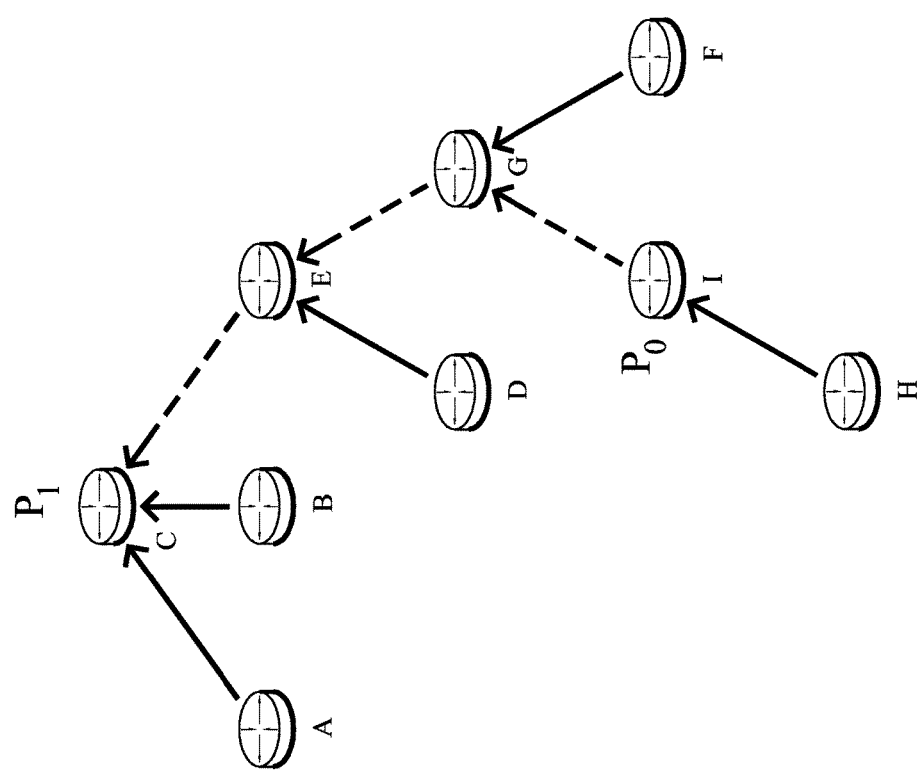

As shown in FIG. 4D, the update process ends when IU 406 reaches the device at the root of the prior forwarding tree, device I. As a result, a new forwarding tree rooted at the new location of the producer, $P_1$, is formed, allowing all devices in the network to properly forward packets towards the new location of the producer. As would be appreciated, only the links along the direct path between locations $P_0$ and $P_1$ require reversal, to afford each of devices A-I the ability to reach the new position of the producer. Thus, in some embodiments, IU 406 may be sent as a unicast update from the new location to the prior location. This allows faster mobility with less disruption on the network than traditional protocols that enforce a global optimization after each movement (e.g., OLSR, MANET-OSPF, Babel, etc.).

Fast producer movement, link losses, or other delays in propagating an IU can lead to concurrent updates. For example, consider the case shown in FIG. 4E. As shown, assume that the producer quickly moves from $P_0$ to $P_1$ to $P_2$. In such a case, device C may send IU 406 with sequence number 1 towards $P_0$. However, prior to IU 406 reaching device G, the next hop along the path to $P_0$, device F may send another IU 408 with sequence 2 towards $P_1$. In such a case, there may be two concurrent updates in the network and three forwarding components rooted at the producer locations $P_0$, $P_1$, and $P_2$.

Figure 4F:
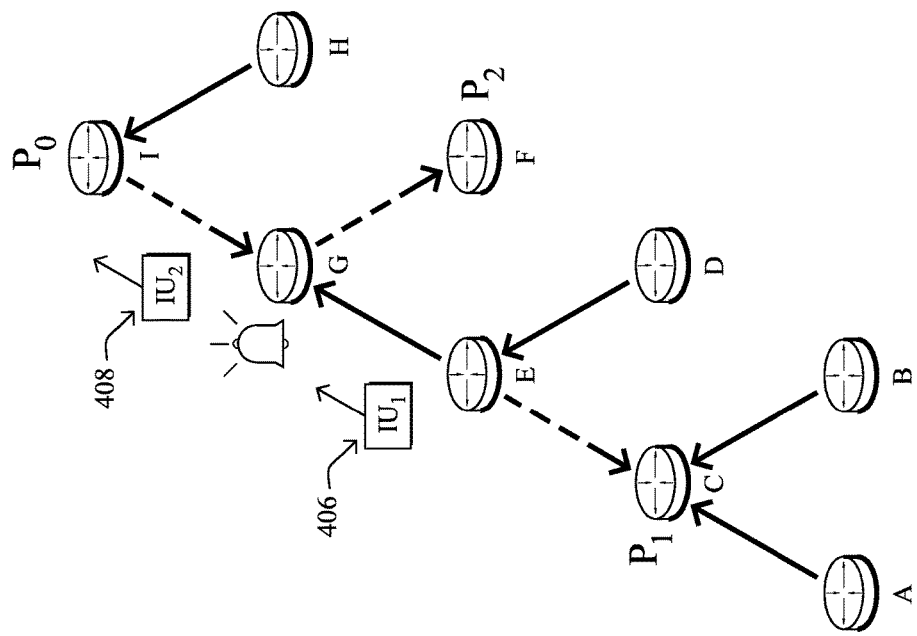
Figure 4E:
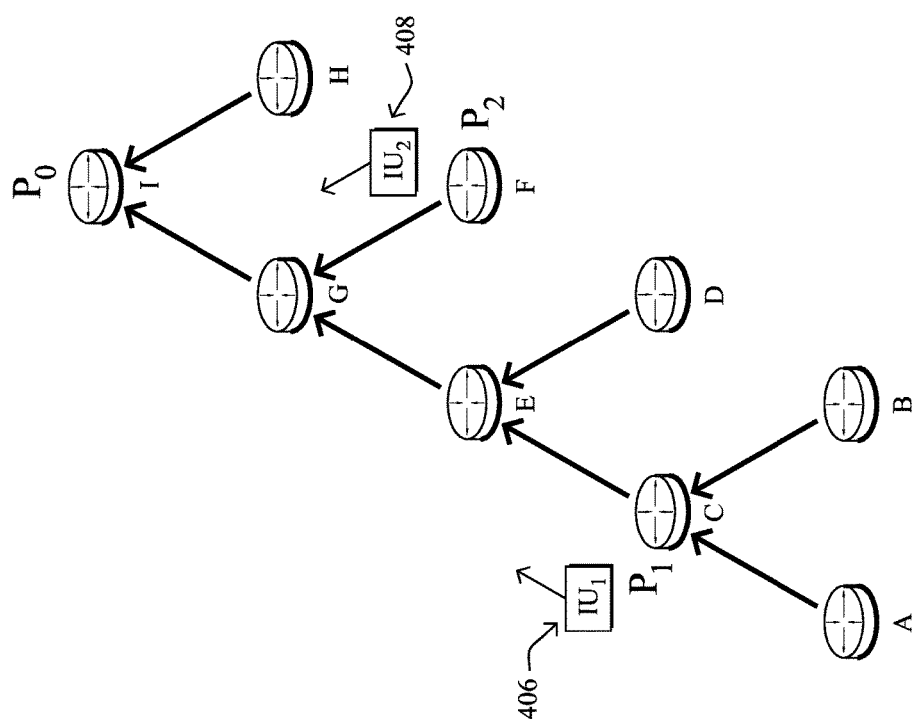
Figures 4G, 4H:
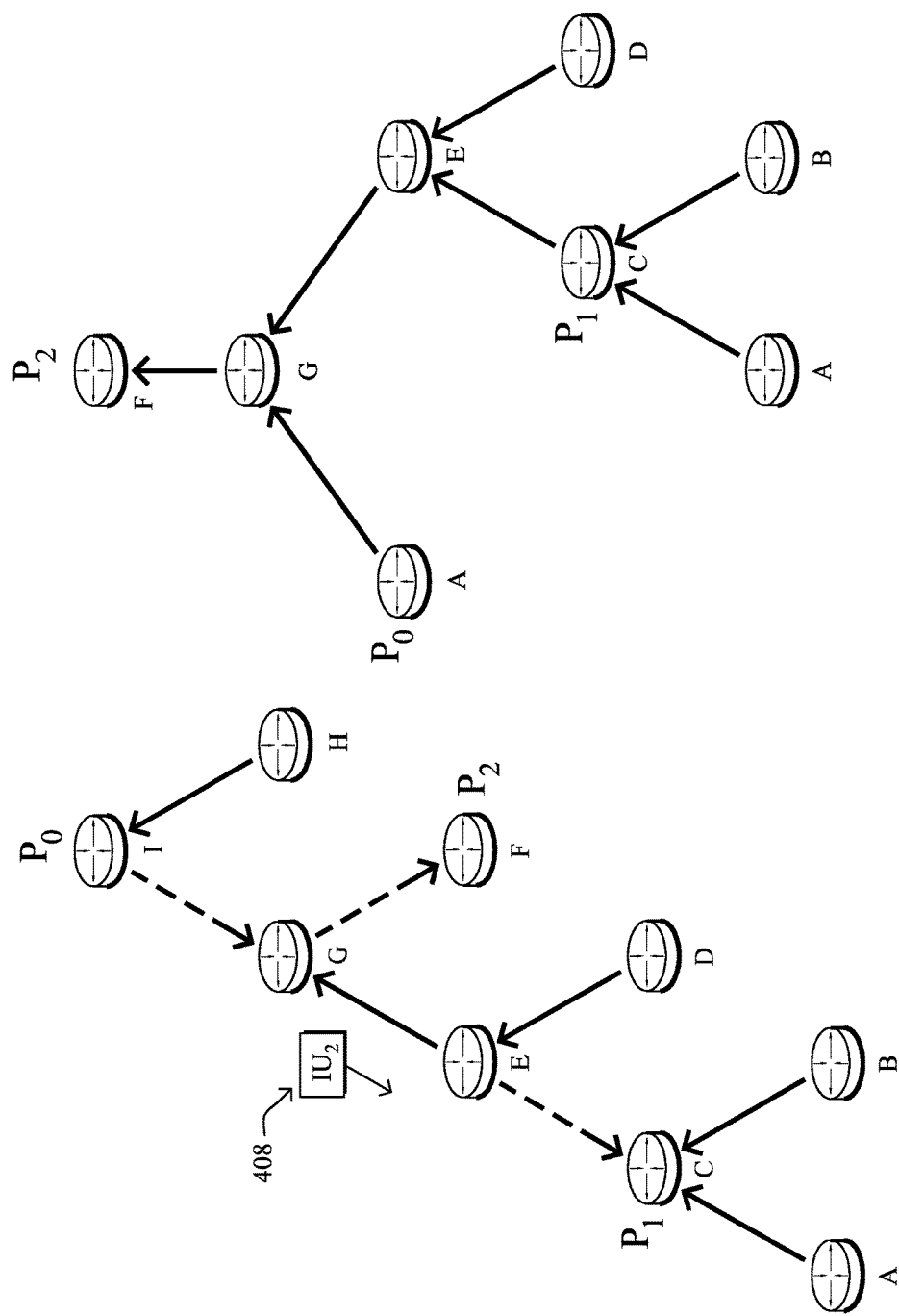

As shown in FIG. 4F, assume that IU 408 with sequence number 2 has already reached the original root, $P_0$. In such a case, when IU 406 with sequence number 1 reaches router G, the FIB entry for the producer at router G will already have a higher sequence number than that in IU 406. In various embodiments, router G may compare the sequence number of any received IU message to the corresponding entry in its FIB, to determine whether the received message has already been superseded. If it has, router G may propagate IU 408 with the highest sequence number in its FIB (e.g., 2) back towards the origin on IU 406 (e.g., $P_1$), as shown in FIG. 4G, using the same update mechanisms above. This allows correcting the outdated information that was propagated by successive previous routers. Consequently, as shown in FIG. 4H, the network will be connected again and be able to consistently route traffic towards the latest producer location, $P_2$.

Figure 5A:
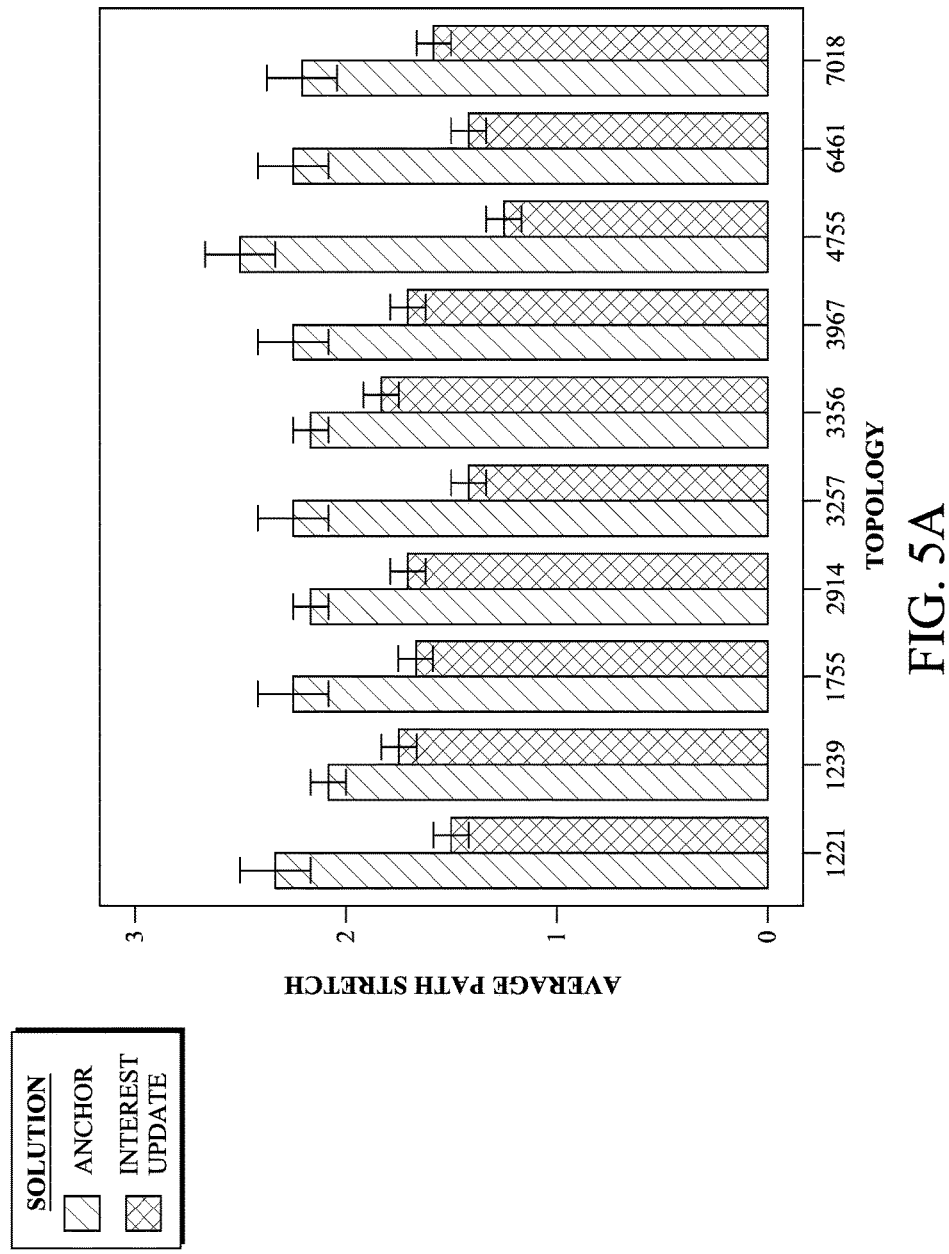
Figure 5B:
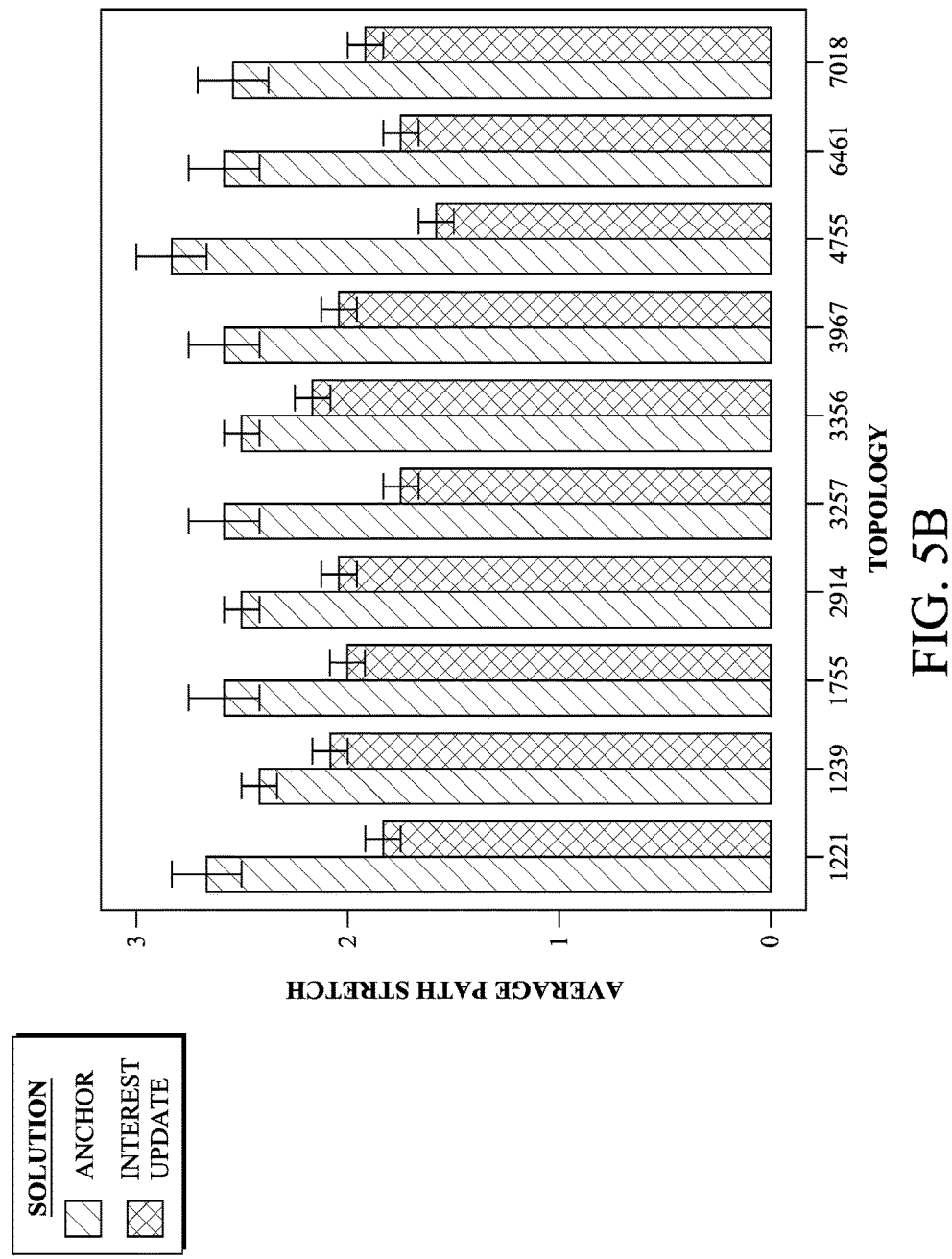

Referring now to FIGS. 5A-5B, example test results are shown using the anchorless techniques herein. In particular, simulations were run using Rocketfuel topologies to compare an anchor-based movement mechanism to the anchorless mechanism disclosed herein that uses interest updates to prompt forwarding changes. In FIG. 5A, the producer movements were randomized. In FIG. 5B, the producer movements were correlated. Based on both results, the techniques herein consistently resulted in shorter average path stretches.

FIGS. 6A-6E illustrate examples of the techniques herein being applied to a shortest path first network, according to various embodiments. As noted above, the techniques allow for a faster routing update by sending an update message between the new and old location of the root/producer node, to return the direction of the links. This is in contrast to traditional, proactive MANET protocols that enforce a global optimization after each movement (OLSR, MANET-OSPF, Babel . . . ). However, according to various embodiments, the techniques herein can still be used with existing approaches such as EIGRP or OSPF, thereby improving MANET implementations.

Figure 6A:
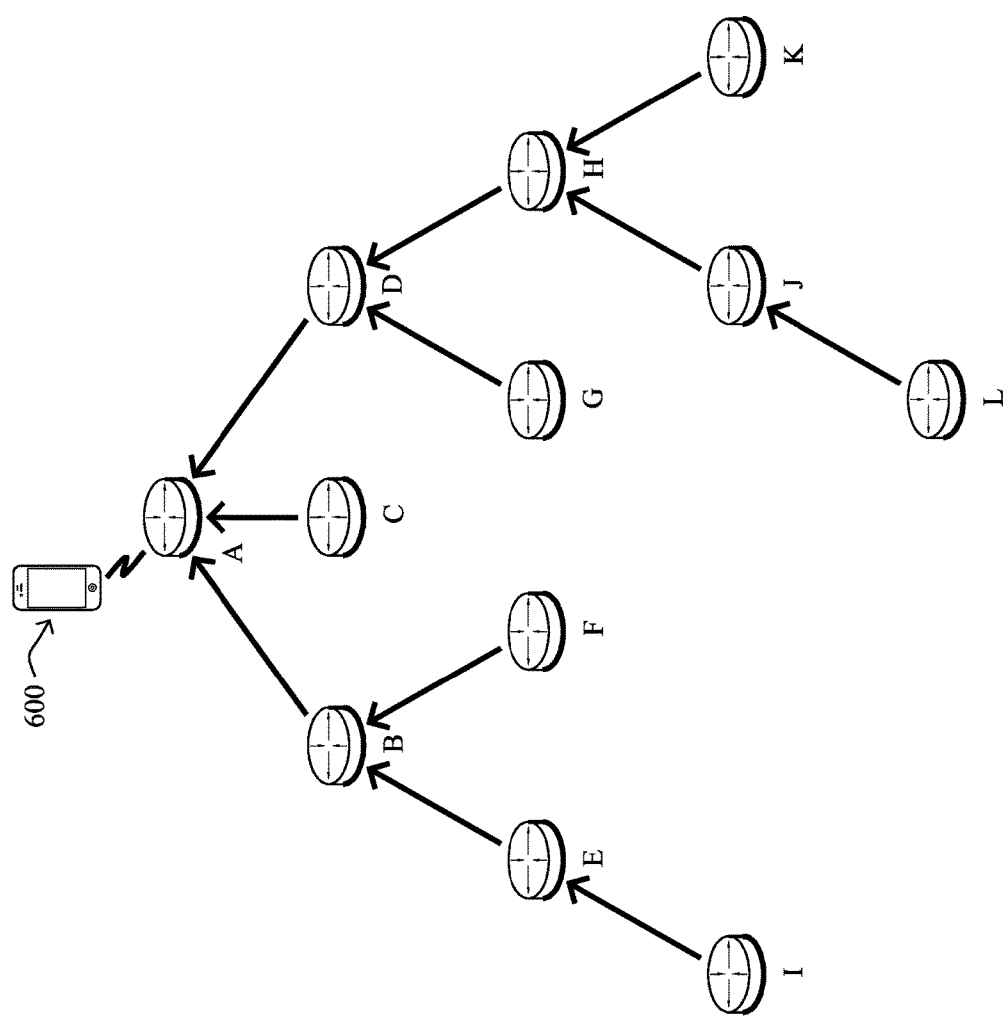
FIGS. 6A-6E illustrate examples of the techniques herein being applied to a shortest path first network.

As shown in FIG. 6A, assume that routers/devices A-L use a shortest path first IGP, such as MANET-OSPF. In its initial state, router/device A may advertise the location of producer node 600 using OSPF signaling. In turn, OSPF may form the reverse, shortest path tree back to node 600 after convergence and rooted at device A. is Babel and other similar routing protocols may operate in a similar manner.

Figure 6B:
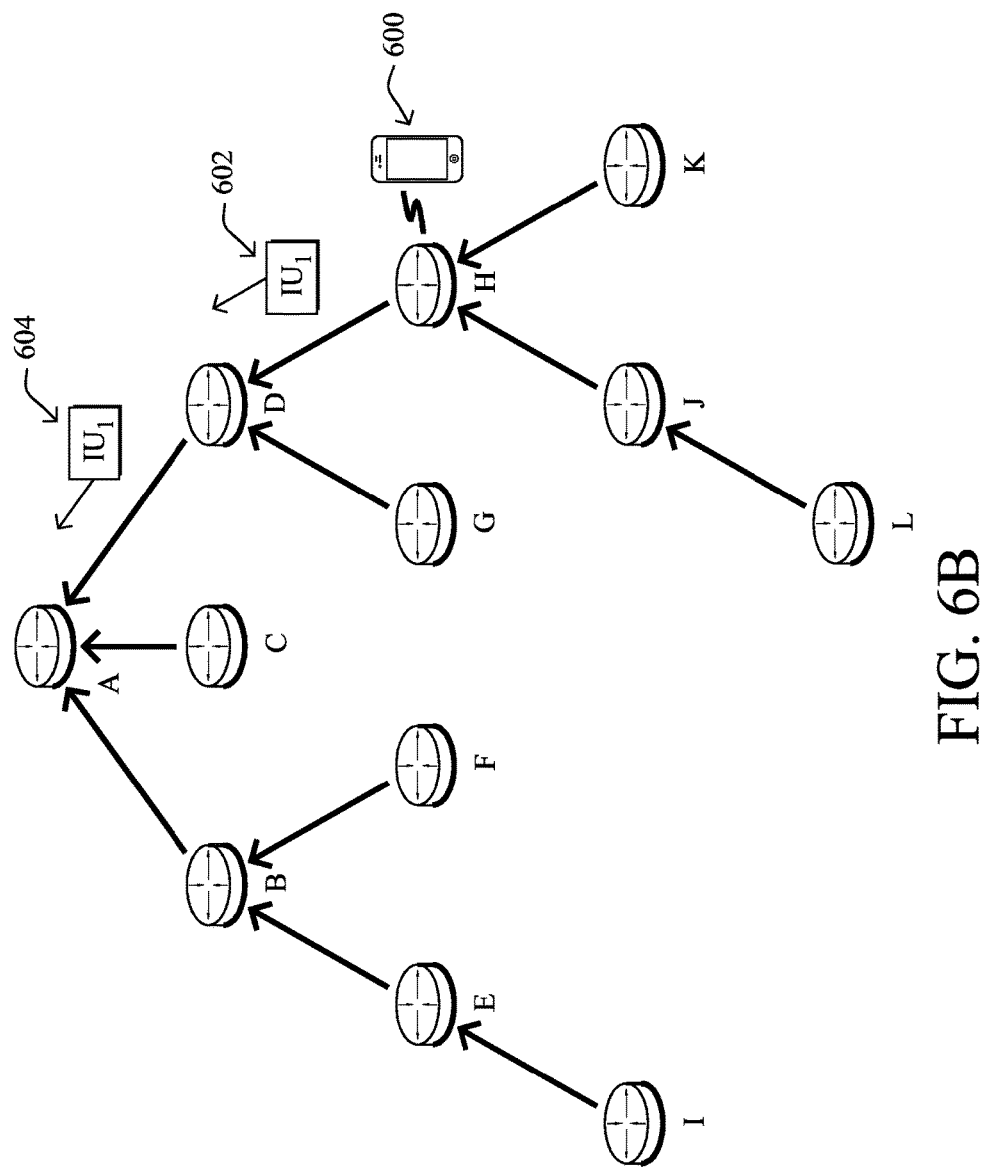

Now, assume that node 600 moves to the position shown in FIG. 6B within proximity to router H. In accordance with the techniques herein, router H may send an IU message 602 towards the prior tree root/location of node 600 that includes an incremented sequence number (e.g., '1') and the prefix information for node 600. In some embodiments, IU message 602 may be sent as a unicast message back towards the prior root.

Figure 6C:
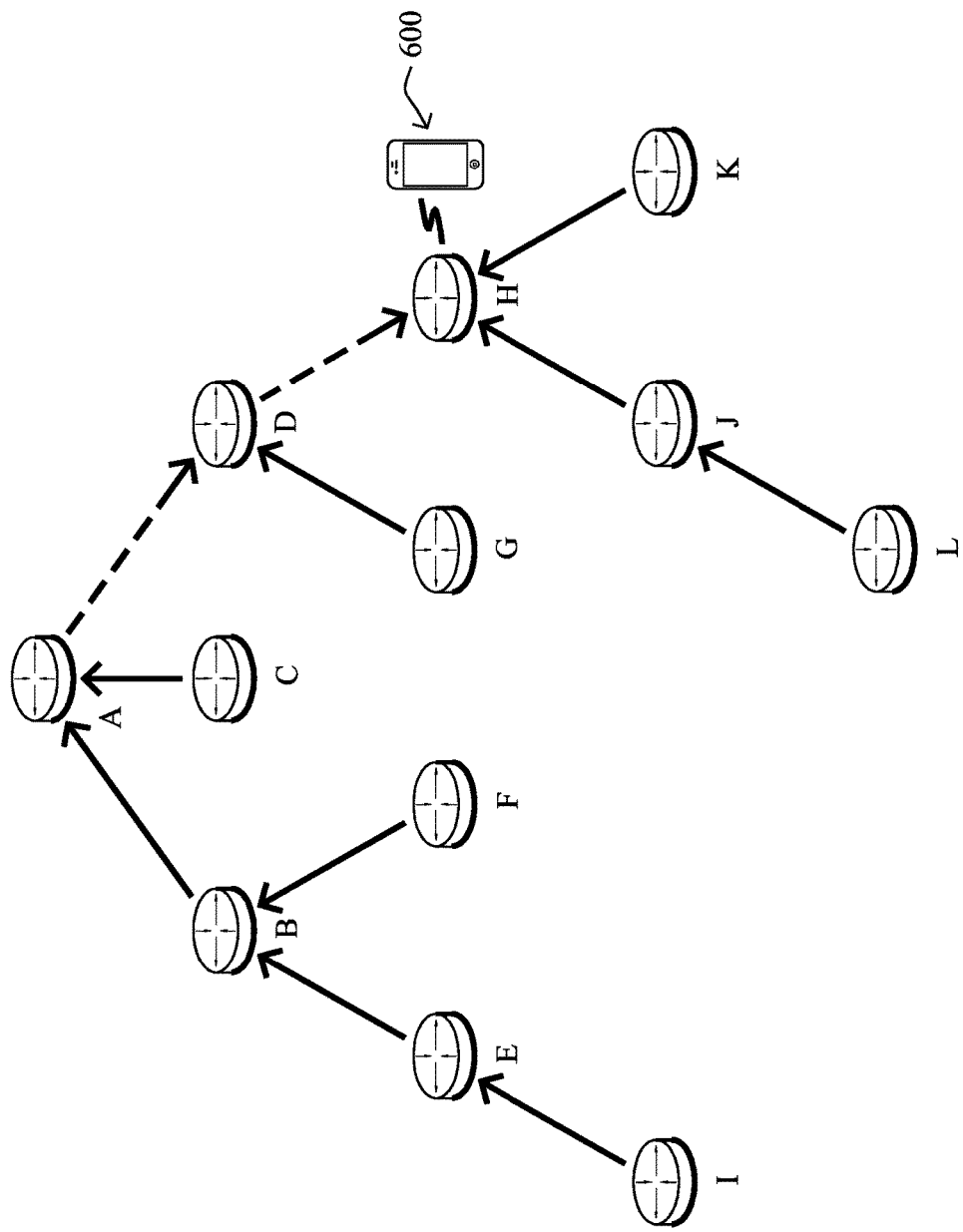

As shown in FIG. 6C, assume that IU message 602 was not superseded by any additional IU message for node 600. In other words, none of the devices receiving IU message 602 have received an IU message for node 600 with a higher sequence number due to a further movement of node 600 in the network. In response to receiving IU message 602, devices A and D may reverse the directions of links A-D and D-H for purposes of forwarding packets to the new location of node 600.

Figure 6D:
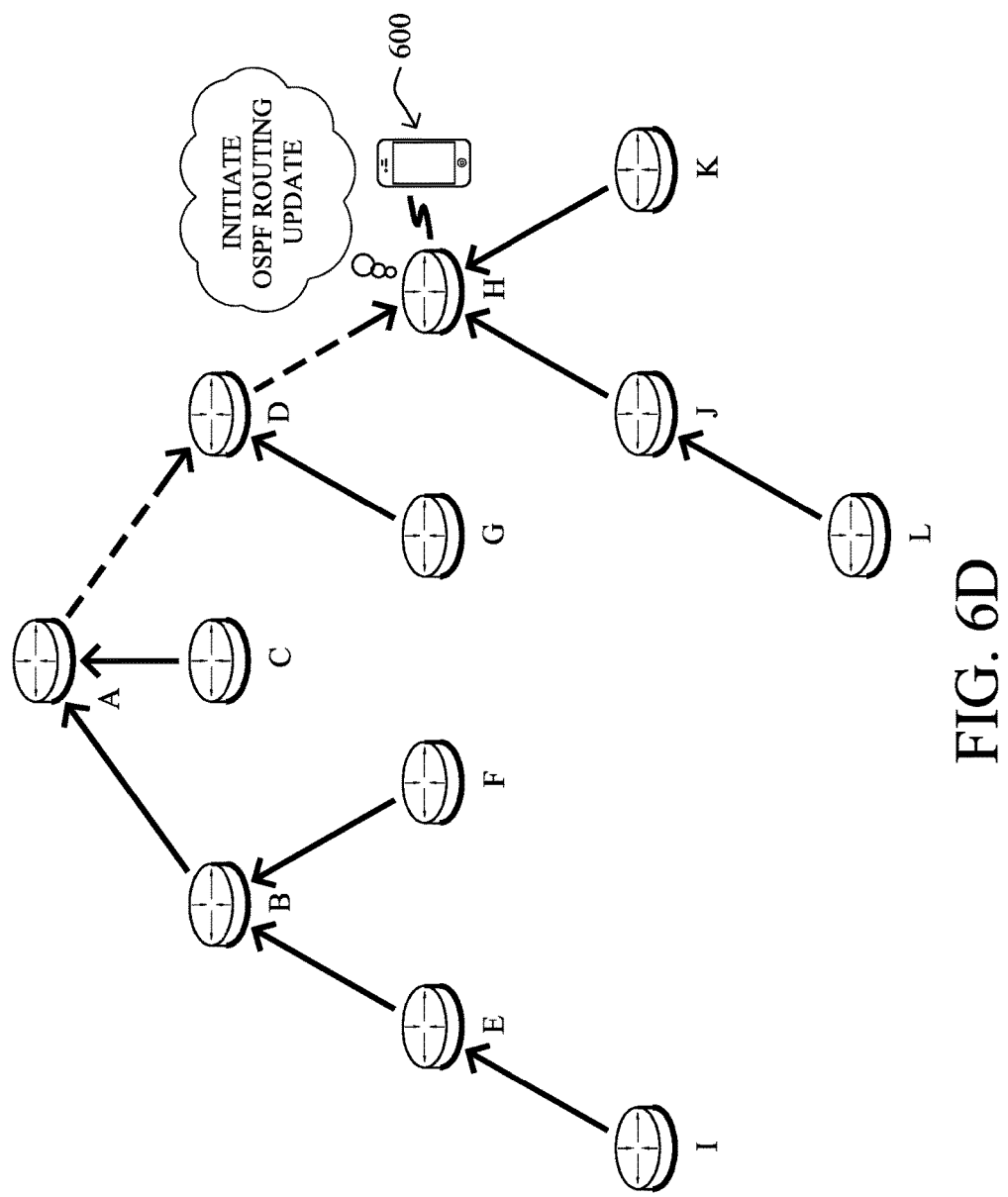
Figure 6E:
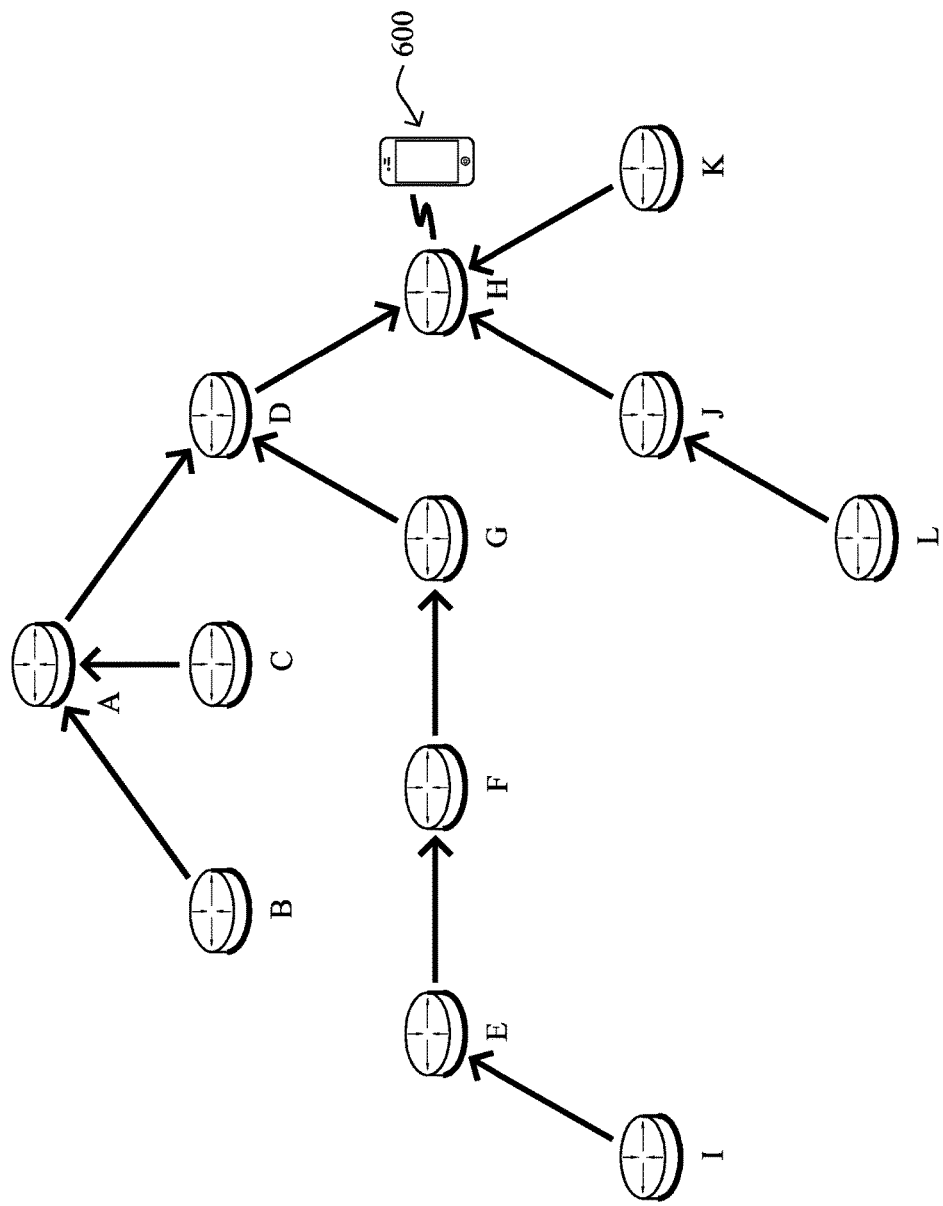

The tree shown in FIG. 6D may not be the shortest path tree available to the new location of node 600, but will still enable devices A-L to forward packets to node 600. In some embodiments, device H may decide to inject node 600 into the original routing protocol (e.g., OSPF, etc.), as shown in FIG. 6D. In doing so, the network may re-converge to a new, shortest path tree rooted at device H that is not necessarily congruent with the previous tree, as shown in FIG. 6E. Interestingly, this step may eliminate some micro-loops since a working path exists in the right direction that can be used during re-convergence.

Figure 7A:
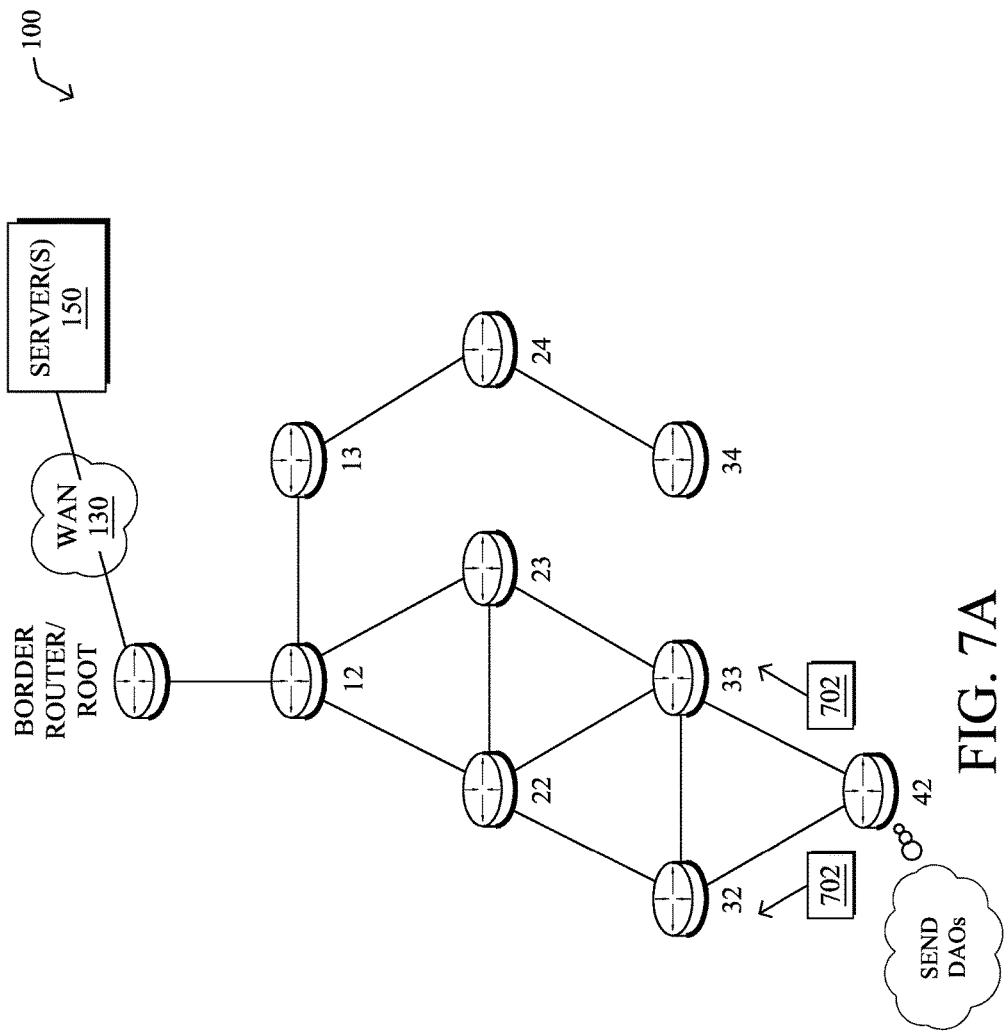
FIGS. 7A-7E illustrate examples of the techniques herein being applied to an RPL-based network.
Figure 7B:
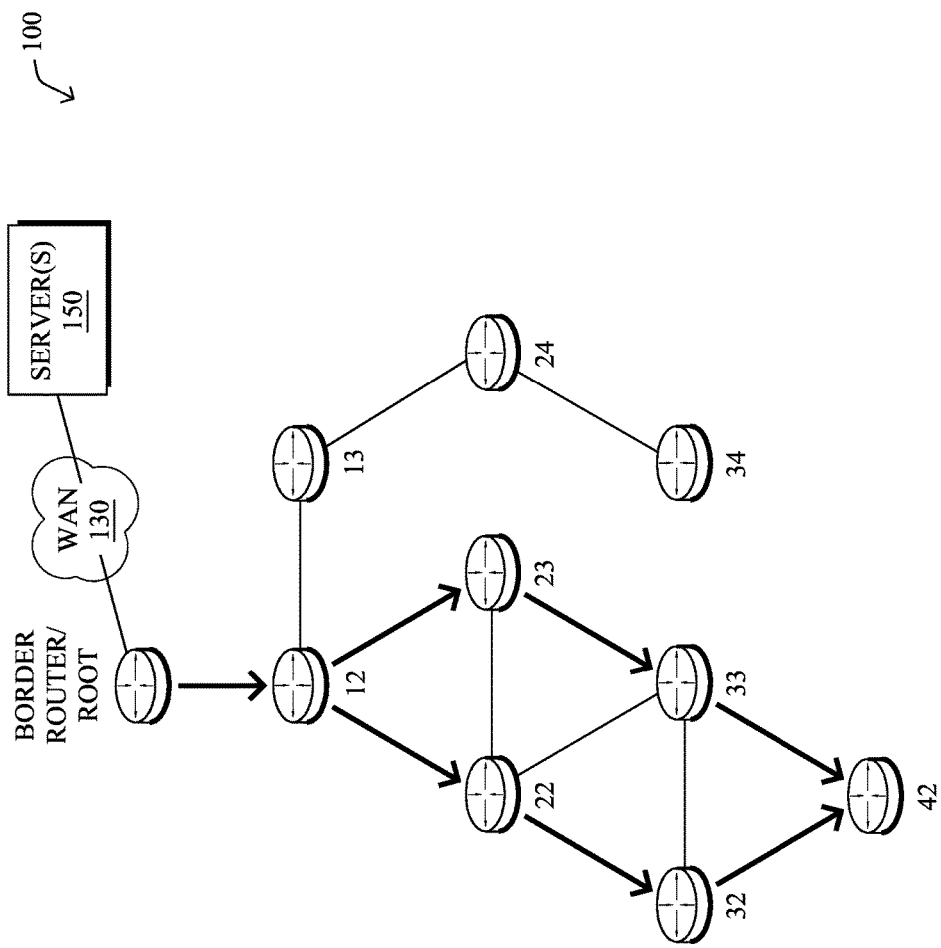

Referring now to FIGS. 7A-7E, examples are shown of the techniques herein being applied to an RPL-based network, according to various embodiments. In contrast to shortest path techniques that form shortest paths rooted at the mobile node, RPL-based networks form DODAGs rooted at a collection of one or more border routers/roots. For example, as shown in FIGS. 7A-7B, device 42 may send DAOs 702 that flow towards the Root device shown, resulting in the formation of the routes shown between the Root and device 42.

Figure 7C:
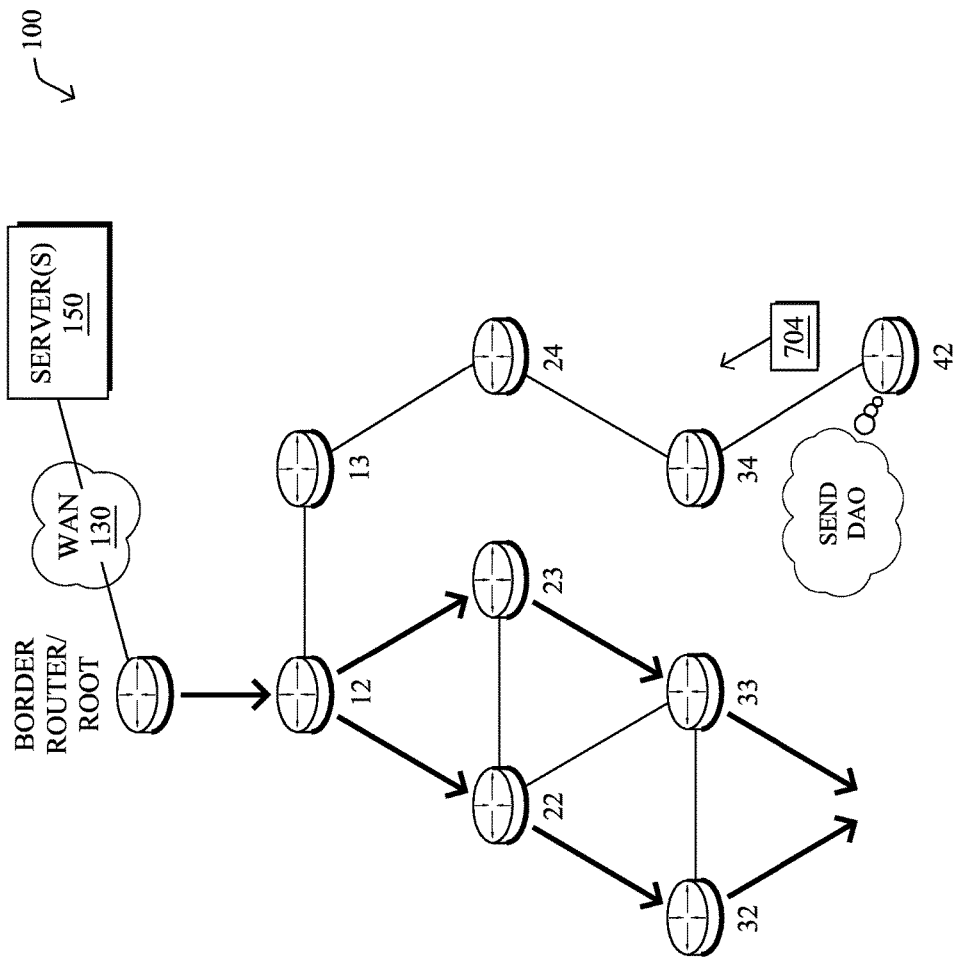

As shown in FIG. 7C, consider the situation in which device 42 now moves to the is position shown and in proximity of device 34. In accordance with RPL, a DAO 704 sent by device 42 will flow up to the border router/Root, thereby restoring connectivity between the Root and device 42. However, this will also result in incorrect, residual states in the prior branch of the network to which device 42 was previously attached.

Figure 7D:
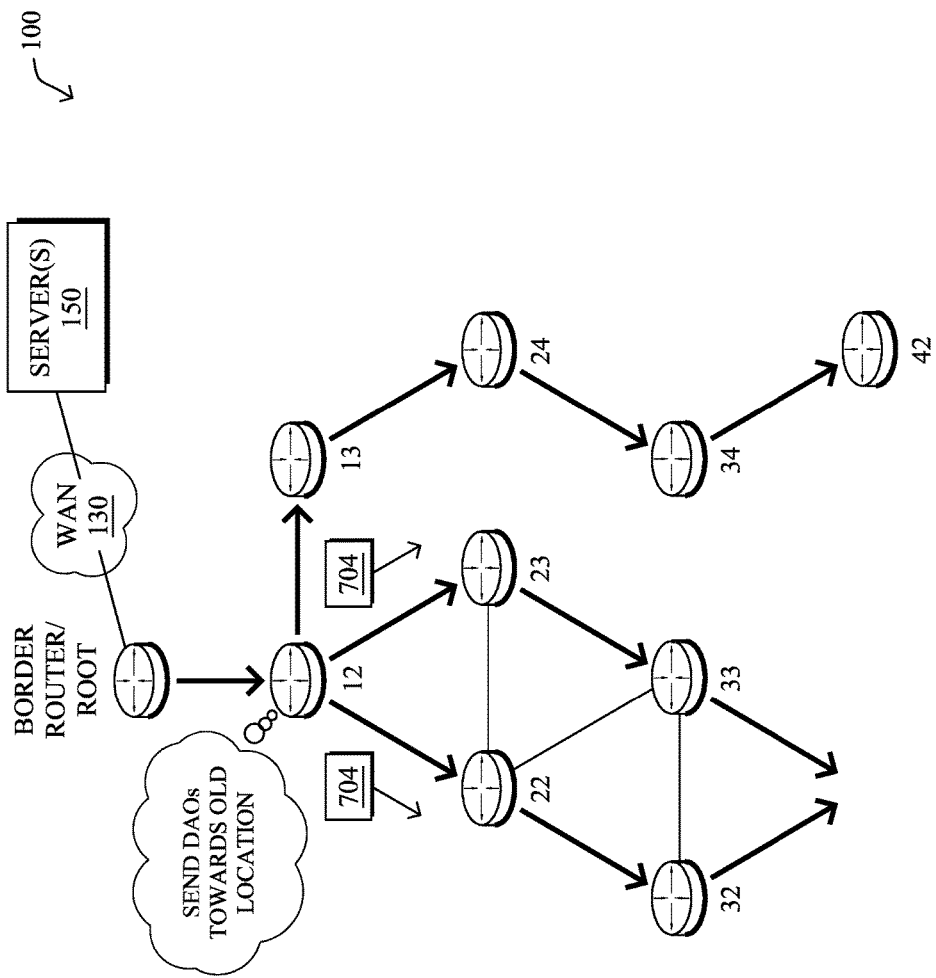
Figure 7E:
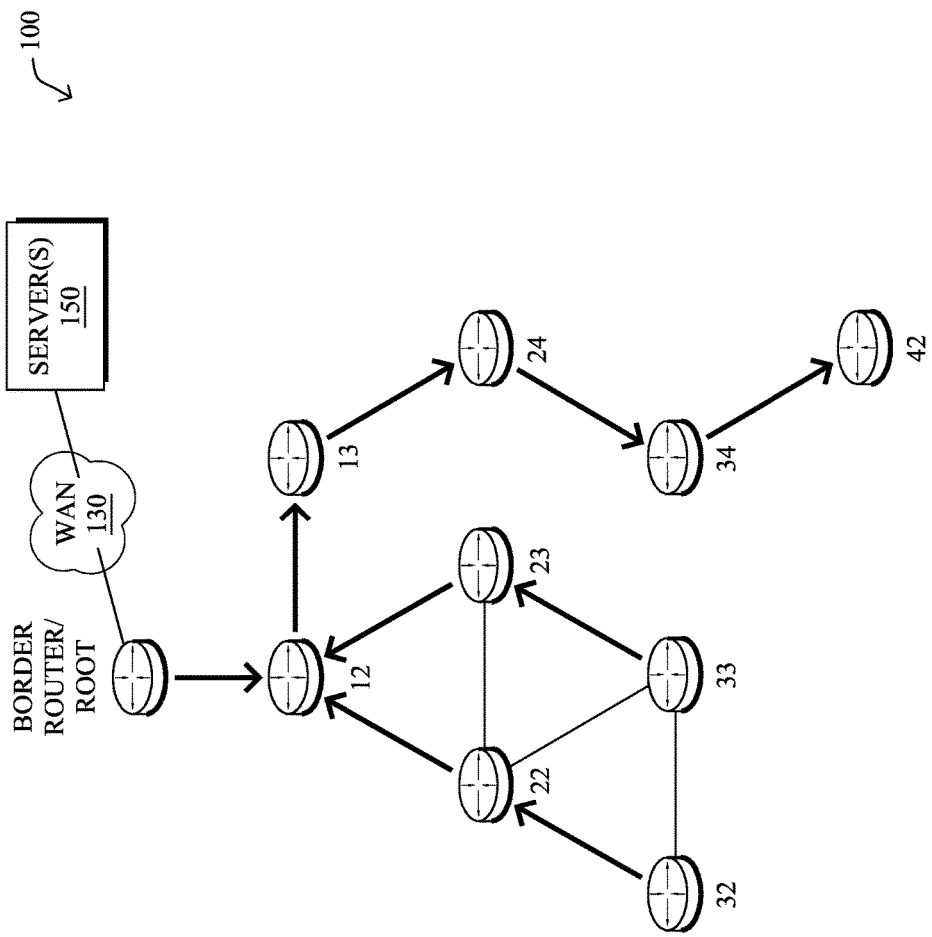

As shown in FIG. 7D, DAO 704 may continue propagating towards the previous location of device 42 in the network, in accordance with the techniques herein. In some embodiments, nodes on the way down to the old location from the common parent(s) that receive the update do not need to reverse their links, as each device in RPL will still maintain a path to the Root. Thus, each node receiving notification of the movement of device 42 may simply erase the stored route to device 42, as the new route is now congruent with the default route to the Root, as shown in FIG. 7E.

Figure 8:
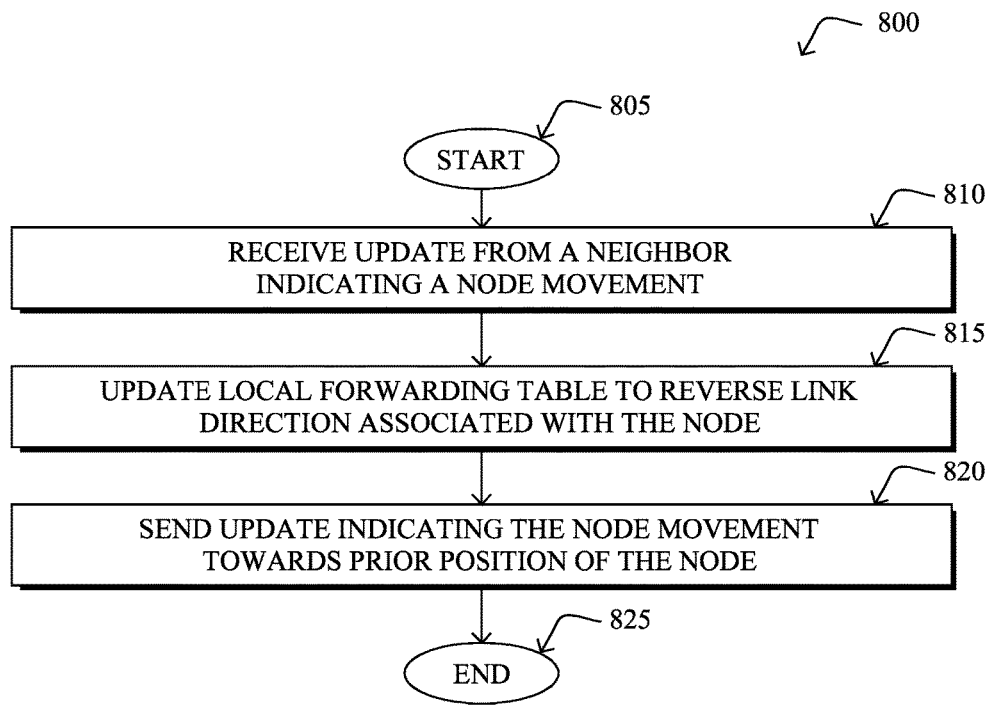
FIG. 8 illustrates an example simplified procedure for performing a forwarding change in an anchorless network.

Referring now to FIG. 8, an example simplified procedure is shown for performing a forwarding change in an anchorless network. In general, procedure 800 may be performed by a device in an anchorless network (e.g., device 200), such as any of the intermediary devices between a border device and a mobile node. Procedure 800 may begin at step 805 and continue on to step 810 where, as described in greater detail above, the device may receive an update message from a neighbor that indicates that a node in the network has moved. In some embodiments, such an update may be an interest update message that includes the prefix associated with the node that has moved. In further embodiments, the message may include a sequence number that corresponds to a number of times the node has moved in the network or has otherwise triggered the sending of update messages.

At step 815, as detailed above, the device may update its local forwarding table to reverse a link direction associated with the node that has moved. In some cases, the device may add or otherwise update an entry in its FIB or other table used to make forwarding decisions such that the prefix for the mobile node points is associated with the face via which the device received the update message regarding the mobile node. In another embodiment, the device may remove an existing entry associated with the mobile node, in favor of allowing a default path to be used to forward packets to the mobile node. For example, in the case of an RPL-based network, a device along a prior branch that was attached to the mobile node may remove a forwarding entry for the mobile node, to allow packets destined to the mobile node to be routed via the default path to the root of the network.

At step 820, the device may send the update message indicating the node movement towards the prior position of the node in the network, as described in greater detail above. In some embodiments, the device may send the update message as a unicast message to the next hop of the device that is associated with the prior position of the mobile node. By doing so, only the nodes along the direct path between the old and new positions of the mobile node may update their link directions. In various embodiments, the device may send the update message after first verifying that the message is the most recently received message regarding the mobile node (e.g., by comparing sequence numbers of update message regarding the node). If the update message has already been superseded, the device may instead send the update message with the most recent sequence number back towards the sender of the update message. Procedure 800 ten ends at step 825.

The techniques described herein, therefore, provide for the low-overhead anchorless managing of producer mobility in information-centric networking. In particular, the techniques herein are simpler than anchor-based or rendezvous-based approaches as it does not require network entities to be responsible for managing user mobility. Also, the techniques herein have a shorter path stretch than anchor-based approaches and lower signaling overhead than existing alternatives. Lastly, the techniques herein are reactive, with smaller handoff delay than anchor-based or rendezvous-based solutions and, hence, provide better user-perceived latency than other solutions.

While there have been shown and described illustrative embodiments that provide for low-overhead anchorless managing of producer mobility in information-centric networking, it is to be understood that various other adaptations and modifications may be made within the spirit and scope of the embodiments herein. For example, the embodiments have been shown and described herein with relation to ICNs. However, the embodiments in their broader sense are not as limited, and may, in fact, be used with other types of networks. In addition, while certain protocols are shown, other suitable protocols may be used, accordingly.

Also, although the techniques herein have been presented for a single next-hop interface, and with the prefix originating from a single interface from a single producer, the techniques can easily be extended to multipath, and multiple interfaces by maintaining different interface identifiers, and corresponding sequence numbers. The latter would correspond to either two separate producers, or a single one with two different network interfaces, WiFi and LTE say. Its hop by hop behavior allows for robustness to link losses by requesting each router to be responsible for the completion of updates it propagates, through a simple retransmission mechanism, for example.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device in an anchorless network, an update message from a first neighbor of the device, wherein the update message indicates a movement of a node in the network to a new position in the network and includes a sequence number that corresponds to a number of movements of the node in the network, and wherein the node updates a forwarding table on the node prior to sending the update message to the first neighbor;
    in response to receiving the update message updating, by the device, a forwarding table of the device to reverse a link direction associated with the node and to include the sequence number; and
    sending, by the device, the update message to a second neighbor of the device towards a prior position of the node in the network to update the second neighbor regarding the movement of the node.

2. The method as in claim 1, further comprising:
    determining, by the device and based on the sequence number, whether the update message is superseded by one or more other update messages regarding the node, wherein the device updates the forwarding table to reverse the link direction in response to a determination that the update message is not superseded by the one or more other update messages regarding the node.

3. The method as in claim 1, wherein the second neighbor of the device is a next hop of the device according to a directed graph rooted at the prior position of the node in the network.

4. The method as in claim 1, wherein the device sends the update message to the second neighbor as a unicast routing protocol message.

5. The method as in claim 1, further comprising:
    determining, by the device, that a second node has moved to be a neighbor of the device;
    generating, by the device, an update message indicative of the second node moving toward the device; and
    sending, by the device, the update message towards a prior position of the second node in the network according to a directed graph rooted at the prior position of the second node.

6. The method as in claim 1, wherein the update message is a Routing Protocol for Low Power and Lossy Network (RPL) Destination Advertisement Object (DAO) message.

7. The method as in claim 1, further comprising:
    sending a request to generate a new shortest path tree to the node, at a time after sending the update message to the second neighbor of the device.

8. The method as in claim 1, wherein the update message is configured to update only a linear portion of a tree routing topology for the network that extends between the prior position of the node in the network and the new position of the node in the network.

9. An apparatus, comprising:
    one or more network interfaces to communicate with an anchorless network;
    a processor coupled to the network interfaces and configured to execute one or more processes; and
    a memory configured to store a process executable by the processor, the process when executed configured to:
        receive an update message from a first neighbor of the apparatus, wherein the update message indicates a movement of a node in the network to a new position in the network and includes a sequence number that corresponds to a number of movements of the node in the network, and wherein the node updates a forwarding table on the node prior to sending the update message to the first neighbor;
        update a forwarding table of the apparatus to reverse a link direction associated with the node, in response to receiving the update message; and
        send the update message to a second neighbor of the apparatus towards a prior position of the node in the network to update the second neighbor regarding the movement of the node.

10. The apparatus as in claim 9, wherein the process when executed is further configured to:
    determine, based on the sequence number, whether the update message is superseded by one or more other update messages regarding the node, wherein the apparatus updates the forwarding table to reverse the link direction in response to a determination that the update message is not superseded by the one or more other update messages regarding the node.

11. The apparatus as in claim 9, wherein the second neighbor of the apparatus is a next hop of the apparatus according to a directed graph rooted at the prior position of the node in the network.

12. The apparatus as in claim 9, wherein the apparatus sends the update message to the second neighbor as a unicast routing protocol message.

13. The apparatus as in claim 9, wherein the process when executed is further configured to:
    determine that a second node has moved to be a neighbor of the device;

generate an update message indicative of the second node moving toward the device; and send the update message towards a prior position of the second node in the network according to a directed graph rooted at the prior position of the second node.

14. The apparatus as in claim 9, wherein the update message is a Routing Protocol for Low Power and Lossy Network (RPL) Destination Advertisement Object (DAO) message.

15. The apparatus as in claim 9, wherein the process when executed is further configured to:

send a request to generate a new shortest path tree to the node, at a time after sending the update message to the second neighbor of the apparatus.

16. The apparatus as in claim 9, wherein the update message is configured to update only a linear portion of a tree routing topology for the network that extends between the prior position of the node in the network and the new position of the node in the network.

17. A tangible, non-transitory, computer-readable media having software encoded thereon, the software when executed by a processor of a device in an anchorless network configured to:

receive an update message from a first neighbor of the device, wherein the update message indicates a movement of a node in the network to a new position in the network and includes a sequence number that corresponds to a number of movements of the node in the network, and wherein the node updates a forwarding table on the node prior to sending the update message to the first neighbor;

update a forwarding table of the device to reverse a link direction associated with the node, in response to receiving the update message; and send the update message to a second neighbor of the device towards a prior position of the node in the network to update the second neighbor regarding the movement of the node.

18. The computer-readable media as in claim 17, wherein the update message is configured to update only a linear portion of a tree routing topology for the network that extends between the prior position of the node in the network and the new position of the node in the network.

* * * * *

UNITED STATES PATENT AND TRADEMARK OFFICE
CERTIFICATE OF CORRECTION

Page 1 of 2

PATENT NO. : 10,178,019 B2
APPLICATION NO. : 15/059985
DATED : January 8, 2019
INVENTOR(S) : Giovanna Carofiglio et al.

It is certified that error appears in the above-identified patent and that said Letters Patent is hereby corrected as shown below:

In the Specification

In Column 3, Line 46, please amend as shown:
ments or hardware logic adapted to execute the software In Column 4, Line 24, please amend as shown:
MANET On-demand Routing (DYMO), etc. Notably, on In Column 4, Line 67, please amend as shown:
can interconnect millions of objects for sensing things like In Column 5, Line 42, please amend as shown:
select a DODAG parent set, and maintain the upward In Column 6, Line 20, please amend as shown:
IP networks has prompted numerous efforts by research In Column 6, Line 61, please amend as shown:
communication are more challenging to support, depend- In Column 8, Line 10, please amend as shown:
router or other device in a network and used to make In Column 8, Line 42, please amend as shown:
different FIBs.

In Column 8, Line 51, please amend as shown:
zero. At a later pint in time, assume that the device Signed and Sealed this
Thirty-first Day of December, 2019

Andrei Iancu
*Director of the United States Patent and Trademark Office*

CERTIFICATE OF CORRECTION (continued)
U.S. Pat. No. 10,178,019 B2

In Column 9, Line 21, please amend as shown:
oncile groups 402-404, $P_1$ may send an IU 406 towards the In Column 11, Line 14 please amend as shown:
after convergence and rooted at device A. Babel and other In Column 11, Line 55, please amend as shown:
device 42 now moves to the position shown and in